United States Patent [19]

Croman et al.

[11] Patent Number: 4,690,266
[45] Date of Patent: Sep. 1, 1987

[54] BELT CONVEYOR HAVING ARTICLE SORTING AND ORIENTING FEATURES

[75] Inventors: Stanley W. T. Croman, Dillsburg; Janet M. Jordan, Camp Hill; Edward J. Paukovits, Jr., Hummelstown, all of Pa.

[73] Assignee: AMP Incorporated, Harrisburg, Pa.

[21] Appl. No.: 314,602

[22] Filed: Oct. 26, 1981

[51] Int. Cl.$^4$ .............................................. B65G 47/24
[52] U.S. Cl. ................................... 198/388; 198/396; 198/398; 198/416; 198/580; 198/636
[58] Field of Search ............... 198/396, 382, 416, 443, 198/406, 390, 388, 391, 383, 398, 399, 400, 394, 580, 633, 636, 637, 392; 221/159, 160, 164

[56] References Cited

U.S. PATENT DOCUMENTS

| | | |
|---|---|---|
| 1,237,315 | 8/1917 | Eby et al. ............................ 198/399 |
| 1,366,874 | 1/1921 | Christians ...................... 198/406 X |
| 2,586,523 | 2/1952 | Dudley, Jr. .......................... 198/416 |
| 2,725,971 | 12/1955 | Clark-Riede .................... 198/388 X |
| 2,939,567 | 6/1960 | Mazura et al. . |
| 2,956,665 | 10/1960 | Arlin ............................... 198/443 X |
| 3,084,782 | 4/1963 | Bower ................................. 198/388 |
| 3,128,868 | 4/1964 | Bowen ........................... 198/416 X |
| 3,240,311 | 3/1966 | Hofer et al. ........................ 198/443 |
| 3,258,105 | 6/1966 | Willsey et al. ..................... 198/383 |
| 3,258,106 | 6/1966 | Booth ............................. 198/396 X |
| 3,330,403 | 7/1967 | Roberts et al. ................. 198/416 X |
| 3,993,187 | 11/1976 | Knez ............................... 198/416 X |

FOREIGN PATENT DOCUMENTS

| | | | |
|---|---|---|---|
| 2302001 | 7/1974 | Fed. Rep. of Germany ...... 198/399 |
| 57-107312 | 7/1982 | Japan .................................. 198/416 |

OTHER PUBLICATIONS

Handbook of Feeding & Orienting Techniques for Small Parts—by G. Boothroyd—Automation Project, University of Massachusetts.
Handbook of Feeding and Orienting Techniques for Small Parts; Boothroyd, Poli, Murch; Univ. of Mass.

Primary Examiner—Robert J. Spar
Assistant Examiner—Jonathan D. Holmes
Attorney, Agent, or Firm—Frederick W. Raring; Thomas G. Terrell

[57] ABSTRACT

Belt conveyor comprises first and second endless belts in side-by-side relationship which move in opposite directions. Articles such as connector housings are loaded onto the first belt at its first end and carried towards the second end of the first belt. The articles may be in either of two stable attitudes. A sorting guide extends transversely across the first belt and separates the articles in the second stable attitude from those in the first attitude, the articles in the second attitude being pushed onto the second belt. The articles pushed onto the second belt are carried to the first end of the second belt and transferred laterally to the first end of the first belt. The attitudes of the articles transferred are changed during transfer so that they are then in the first stable attitude. The articles which pass the sorting guides in the first attitude are guided to the second end of the first belt, transferred to the second end of the second belt, and then transported to a discharge station at the first end of the second belt. These articles are reoriented during travel on the second belt so that they are all in the first stable attitude and in a preferred specific orientation.

10 Claims, 15 Drawing Figures

BELT CONVEYOR HAVING ARTICLE SORTING AND ORIENTING FEATURES

This invention relates to belt conveyors and particularly to conveyors which have guides for moving the articles into preferred orientations while they are carried along the belt.

A known type of belt conveyor comprises first and second endless belts in side-by-side adjacent relationship. Articles are loaded onto the first belt at a first end of the first belt and carried to the second end of the first belt. They are then transferred by a transfer guide to the second end of the second belt which moves in the opposite direction and carries the articles to the first end of the second belt. During movement with the second belt, the articles are displaced laterally on the belt and arrive at a discharge station which is at the first end of the second belt. The articles are oriented during travel by an orienting guide. If the articles can be in more than one attitude, only those articles in a preferred stable attitude are carried to the discharge station and the other articles are guided laterally to the first end of the first belt. The first end of the first belt is on a level lower than the first end of the second belt and the articles therefore fall onto the first end of the first belt and during falling, some of the articles will tumble and land on the first belt in the preferred attitude. These articles can then be recirculated and delivered to the discharge station in the proper orientation and in the proper attitude.

Belt conveyors of the type described above are shown in the "Handbook Of Feeding And Orienting Techniques For Small Parts" which was published by the Department of Mechanical Engineering of the University of Massachusetts. This handbook was produced from work carried out during a research project directed by Geoffrey Boothroyd et al., and is published under the names of the researchers. The handbook referred to above discloses belt conveyors for relatively simple shapes such as channel shapes, cylindrical articles, prismatic articles having rectangular surfaces, and washers. It would be desirable to expand the capabilities of belt conveyors of the type described in the above mentioned handbook so that they would be capable of handling relatively complex shapes, such as electrical connector housings having surfaces which are not entirely coplanar and having projecting members such as latch arms.

The present invention is directed to the achievement of an improved belt conveyor of the general type described in the above mentioned handbook and which is capable of handling aritcles having relatively complex and irregular shapes. The invention is further directed to the achievement of a belt conveyor which is capable of delivering articles to the conveyor discharge station in a preferred stable attitude and in a preferred orientation.

A belt conveyor in accordance with the invention comprises first and second endless belts in side-by-side relationship which are movable in opposite directions. The articles, such as connector housings, are loaded onto the first end of the first belt and carried towards the second end of the first belt. The articles may be in either a first or second preferred attitude and are randomly oriented when delivered to the first belt. A sorting guide extends across the first belt and the articles in the second stable attitude are moved laterally by the sorting guide onto the second belt which carries them to the first end of the second belt which is adjacent to the first end of the first belt. These articles are then moved laterally by a return guide to the first end of the first belt. The first end of the first belt is at a level below the first end of the second belt and the articles tumble onto the first end of the first belt when they are ejected from the second belt. During tumbling, some of the articles will assume the first stable attitude so that when they next reach the sorting guide, they will pass the sorting guide and continue on the conveyor path. A series of guides are provided on the first and second belts and aligning the articles which pass the sorting guide and for changing the orientation of the articles so that all of the articles delivered to a discharge station are in the first preferred and stable attitude and in a predetermined orientation.

In accordance with further aspects thereof, the invention comprises a tumbling or attitude changing guide which extends from a location adjacent to the first end of the second belt and overhangs the first end of the first belt. The articles in the second attitude, which are moved laterally from the second belt to the first belt, move over this tumbling guide and caused to tumble, thereby increasing the probability that they will land on the first belt in the first preferred and stable attitude.

In accordance with the further aspect, the invention is directed to the achievement of a belt conveyor as generally described above, but having a first belt of indeterminate length which extends beyond the second end of the second belt. Various aligning guides are provided on the first belt at locations beyond the second end of the second belt.

PREFERRED EMBODIMENT

Figure 1:
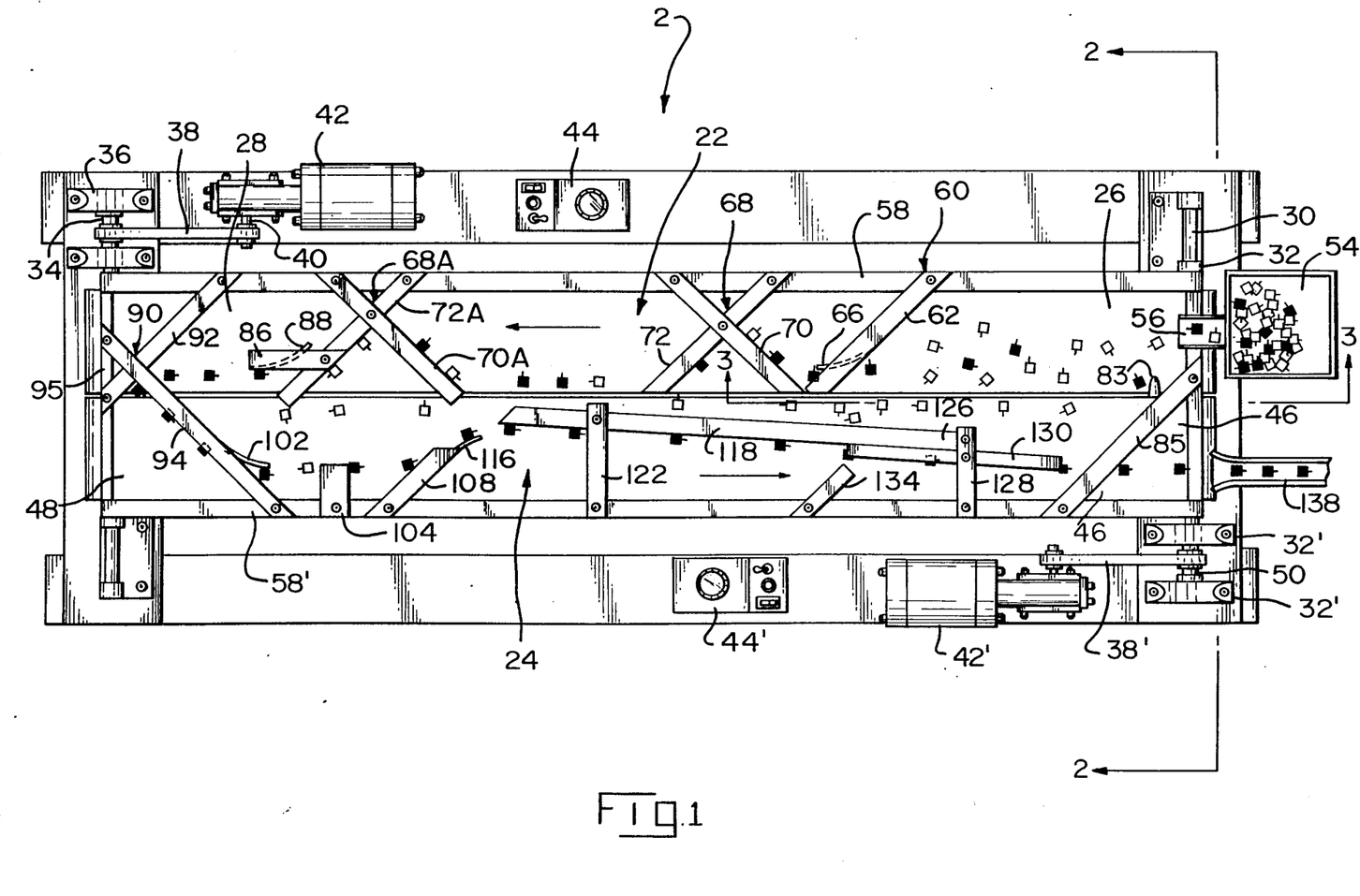
FIG. 1 is a plan view of a belt conveyor in accordance with the invention.
Figure 14:
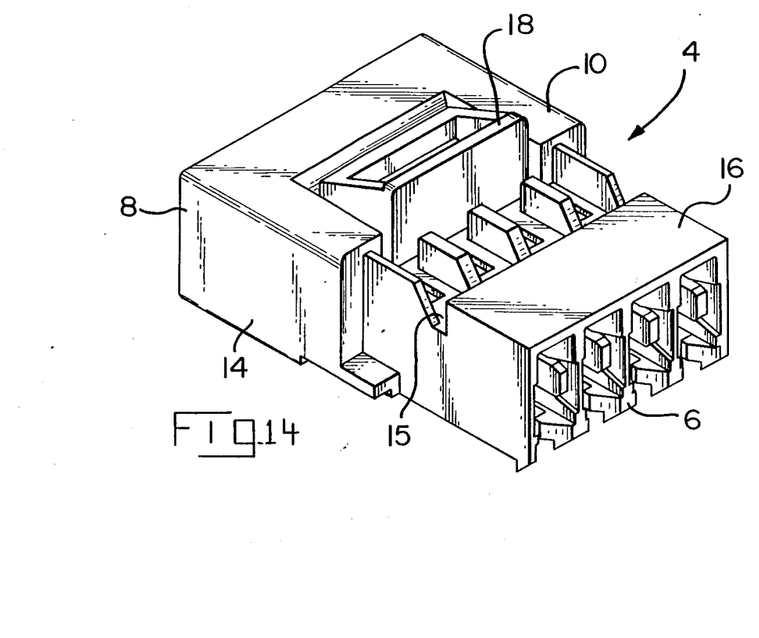
FIG. 14 is a perspective view of an electrical connector housing resting on a surface in a first stable attitude.
Figure 15:
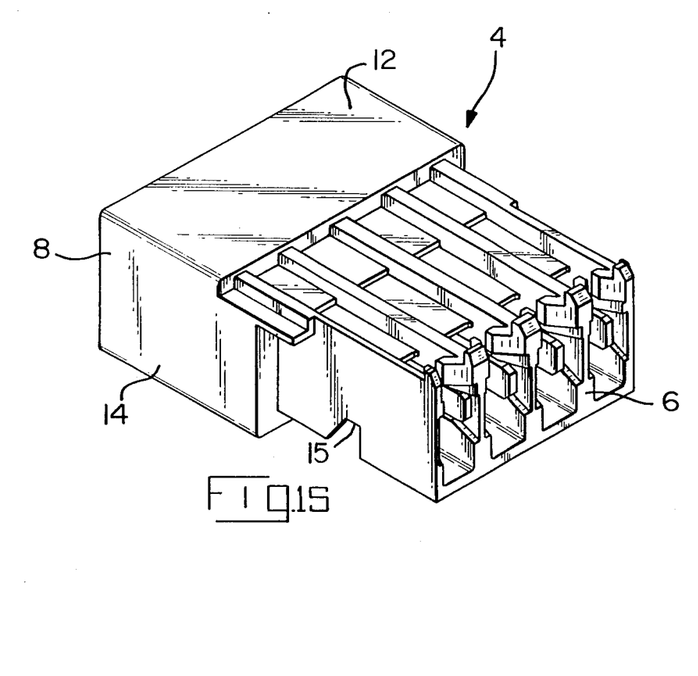
FIG. 15 is a perspective view of the connector housing resting on the surface in the second stable attitude.

A belt conveyor 2, as shown in FIG. 1, feeds electrical connector housings, FIGS. 14 and 15, from a loading zone to a discharge station. Each of the housings 4 has a wire entry face or end 6, a mating face or end 8, external sidewalls 10, 12 and external endwalls 14 which extend between the ends or faces 6, 8. The sidewall 10 has a portion 16 which is adjacent to the end 6 which is on a level lower than the sidewall portion at the end 8 and a latch arm 18 projects above the surface of this sidewall. The housing as shown in FIG. 14 is regarded as being in a first stable attitude in that its sidewall 12 is resting upon the surface and the housing is shown in FIG. 15 in a second stable attitude in that the sidewall 10 is against or opposed to the supporting surface. The second stable attitude of FIG. 15 is less stable than the attitude shown in FIG. 14 as illustrated in FIGS. 7–10. The term "orientation" is used in the following description to refer to the direction of the axis of the housing on the conveyor belts and the term "attitude" is used to denote which surface of the housing is against the surface of the conveyor belt. The disclosed embodiment of the invention delivers housings in the first stable attitude to a discharge station 138, FIG. 4, with the housings in an orientation as shown.

The conveyor 2 comprises first and second endless belts 22, 24 which move in opposite directions as indicated by the arrows. The first belt 22 has a first end 26 and a second end 28 and the second belt has a first end 46 and a second end 48. The first ends 26, 46 are adjacent to each other, as are the second ends 28, 48.

Figure 2:
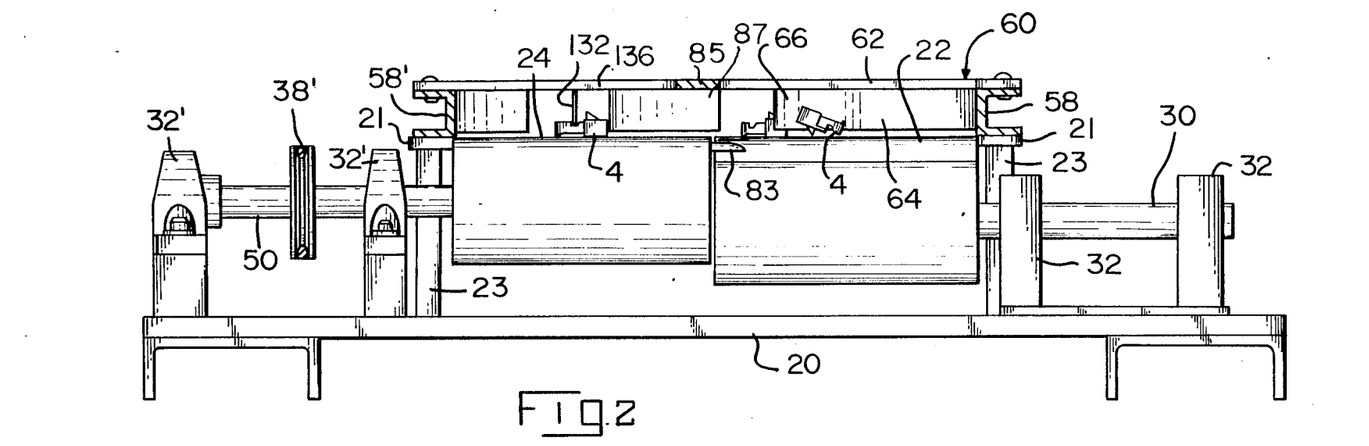
FIGS. 2 and 3 are views taken along the lines 2—2 and 3—3 of FIG. 1.
Figure 3:
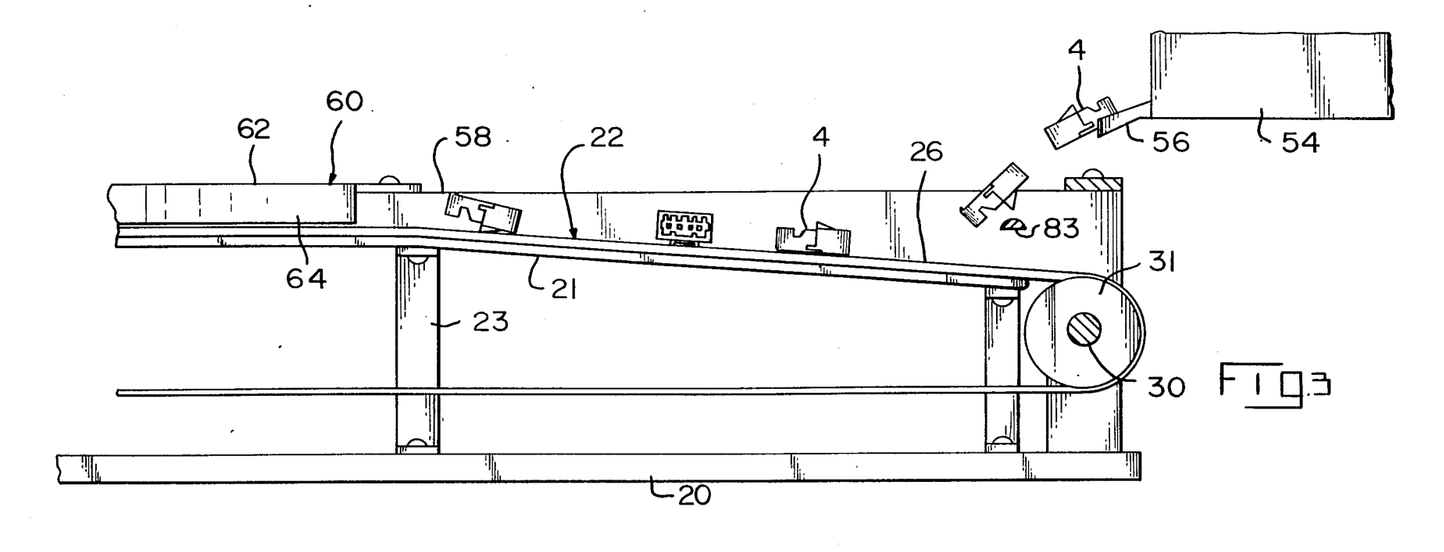

The entire assembly is supported on a suitable supporting plate or table 20 having columns 23 extending therefrom which in turn support a belt supporting plate 21 which extends under the belts, see FIGS. 2 and 3.

The first belt is supported on a roller 31 at its first end which is keyed to a shaft 30 that extends laterally to support bearings 32. As shown in FIG. 3, the first end 26 of the first belt is inclined downwardly to this roller and this end of the belt is therefore below the level of the first end 46 of the second belt. The two belts are otherwise coplanar.

The first belt 22 is supported at its second end 28 by a roller, not specifically shown, on a shaft 34 which is supported in bearings 36. The shaft 34 is coupled by a drive belt 38 to a pulley on the output shaft 40 of a variable speed gear motor 42, the speed of which is controlled by a control box 44. The roller which supports the second belt 24 at its first end 46 has a shaft 50 supported in bearings 32' and which is coupled by a drive belt 38' to a similar motor 42' controlled by a control box 44'. The two belts can thus be moved at different speeds as required by operating conditions.

Electrical connector housings 4 are loaded onto the loading zone at the first end 26 of the first belt from a hopper 54 having a spout 56 as shown in FIG. 3. The housings may be in either of the two stable attitudes when they fall on the first belt and will be randomly oriented. The housings, as they are carried along the first belt and the second belt, encounter a series of guides which are fixed to channel members 58, 58' that extend on each side of the belts and are fixed to the support plate 21. These guides will be described in the order in which they are encountered by the housings.

The housings first encounter a flow constricting guide 60 in the form of an L-shaped member having a horizontal section 62 and a depending flange 64. The portion 66 of the flange adjacent to its free end is cut away from the horizontal section 62 and bent arcuately in the direction of movement of the belt. Since the housings cannot get past the flange 64, they must pass through the gate formed by the arcuately bent section 66 of the flange and the housings are therefore admitted to the next adjacent guide 68 in single file. The flow constricting guide 60 thus functions to restrict the number of housings which are moved over subsequent sections of the belts. If a surplus of housings 4 are loaded onto belt 22, the surplus housings will be deflected onto belt 24 and recirculated as described below.

The housings which pass the flow constricting guide 60 may be in either of the stable attitudes of FIGS. 14 and 15 and the guide 68 functions as a sorting guide which permits articles in the first stable attitude to pass, but which rejects articles in the second stable attitude onto the second belt 24.

Figure 7:
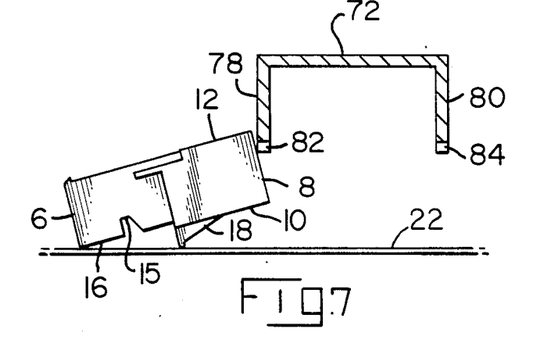
FIG. 7 is a view taken along the lines 7—7 of FIG. 5.
Figure 8:
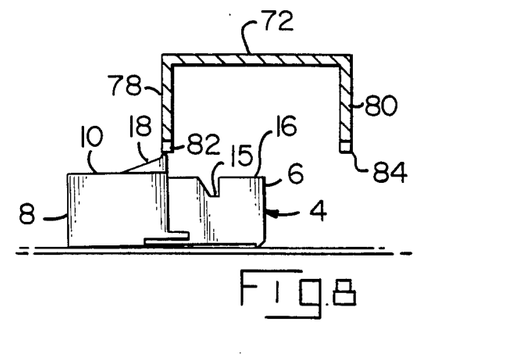
FIGS. 8, 9, and 10 are views similar to FIG. 7 but showing connector housings in different attitudes relative to the sorting guide which is shown in FIG. 7.

As shown in FIGS. 5 and 7–11, the sorting guide 68 comprises a first guide bar 70 which extends diagonally across the first belt in an upstream (in relation to the direction of belt movement) direction and a second guide bar 72 which extends diagonally downstream. The guide bar 70 is L-shaped and has a depending flange 74 which prevents housings from passing until they are deflected along the flange to a gate 76, this gate being formed by merely removing a portion of the flange 74. The guide bar 72 is channel-shaped having depending flanges 78, 80. The flange 78 causes the articles to be moved diagonally, as viewed in FIG. 5, towards the free end of the guide bar 72 until they encounter a sorting gate which is illustrated in FIGS. 7–10. In the vicinity of the sorting gate the flanges are cut away as shown at 82 and 84 so that articles in the first stable attitude, FIG. 8, are permitted to pass through the gate. These articles will be carried along the belt to a second sorting guide 68a as described below.

Housings or other articles in the second stable attitude as shown in FIG. 7, cannot pass the sorting guide but bear against the external surface of the flange 78 in the vicinity of the gate. The movement of the belt and the effect of the static guide flange 78 causes articles in the attitude of FIG. 7 to be moved laterally onto the second belt 24, which carries them to the first end of the second belt. These articles encounter a return guide 85 which has a depending flange that directs the housings towards the first belt in a manner explained below.

Figure 9:
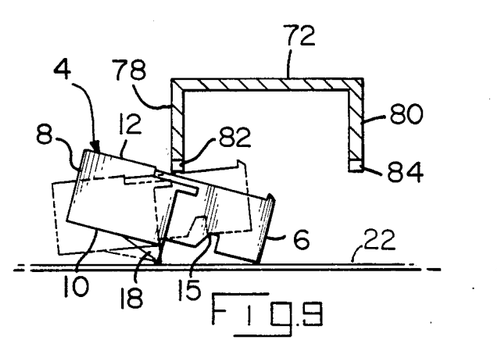
Figure 10:
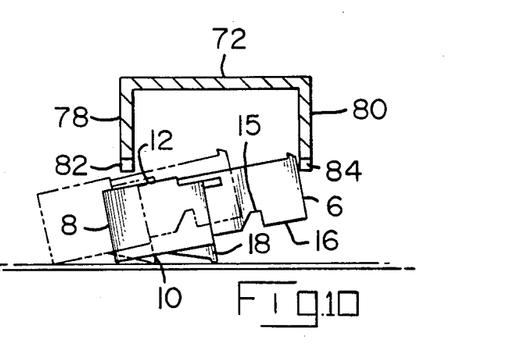
Figure 11:
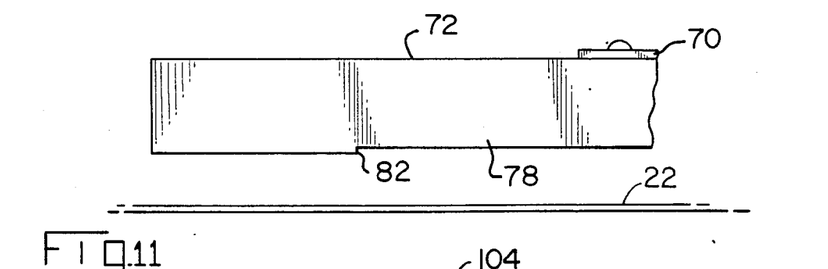
FIG. 11 is a view taken along the lines 11—11 of FIG. 5.

FIG. 9 shows a housing 4 in a third possible attitude, which is a variation of the attitude shown in FIG. 7. In FIG. 9, the wire entry end 6 of the housing is against the surface of the belt and the mating end 8 is elevated. The housing shown in FIG. 9 will be carried by the belt partially through the cut away portion 82 of flange 78 until the flange engages the sidewall 12 of the housing, at which time it will be rocked and assume the dotted line position shown in FIG. 10. The housing can thus pass the flange 78, however, the elevated end 6 of the housing will engage the internal surface of the flange 80 and the housing shown in FIG. 10 will therefore be carried laterally to the second belt, as previously described.

When the housings are returned from the second belt to the first end 26 of the first belt, they will fall onto the surface of the first belt and it is desirable to encourage tumbling of the housings as they fall so that the probability of their landing in the first attitude will be improved. Such tumbling is brought about by a tumbling guide or attitude changing guide 83 which projects over the surface 26 of the first belt, as shown in FIG. 2. This attitude changing guide has a generally conical upper surface, see FIG. 3, which causes the housings to change their attitudes during falling onto the first belt.

A second sorting guide 68a is provided downstream from the first sorting guide 68 and has guide bars 70a, 72a which are sustantially identical to the previously described guide bars. Under some circumstances a housing in the attitude of FIG. 10 may be caused to rock as the result of movement of the belt and pass through the sorting gate of the first sorting guide 68. If this happens, the housings which pass in this attitude will encounter the second sorting guide 68a and will be returned to the second belt as shown in FIG. 1.

The sorting guide 68a has an additional aligning guide 86 in the form of an L-shaped member bolted to the guide bar 72a and extending parallel to the direction of belt movement. The flange 88 of this aligning guide is bent arcuately, as shown, adjacent to the sorting gate so that housings passing the gate will move along the arcuate surface of the flange 88 and will be in alignment with each other as they move to the end 28 of the first belt. At this stage, all of the housings should be in the first stable attitude but they will not be in the preferred orientation which is desired at the discharge station 138.

The housings arriving at the second end 28 of the first belt are transferred laterally to the second end 48 of the second belt by a transfer guide 90 comprising guide bars 92, 94 which are secured to a transversely extending support bar 95. The guide bar 92 is an L-shaped member having a depending flange 96 which deflects the housings arriving at the second end 28 of the belt so that they pass through a gate 100 in the L-shaped guide bar 94. The flange 98 of the guide bar 94 guides the articles diagonally on the second belt and the end of this flange 102 is arcuately formed towards the direction of movement of the second belt so that the articles are directed and carried towards an orienting guide 104.

Figure 6:
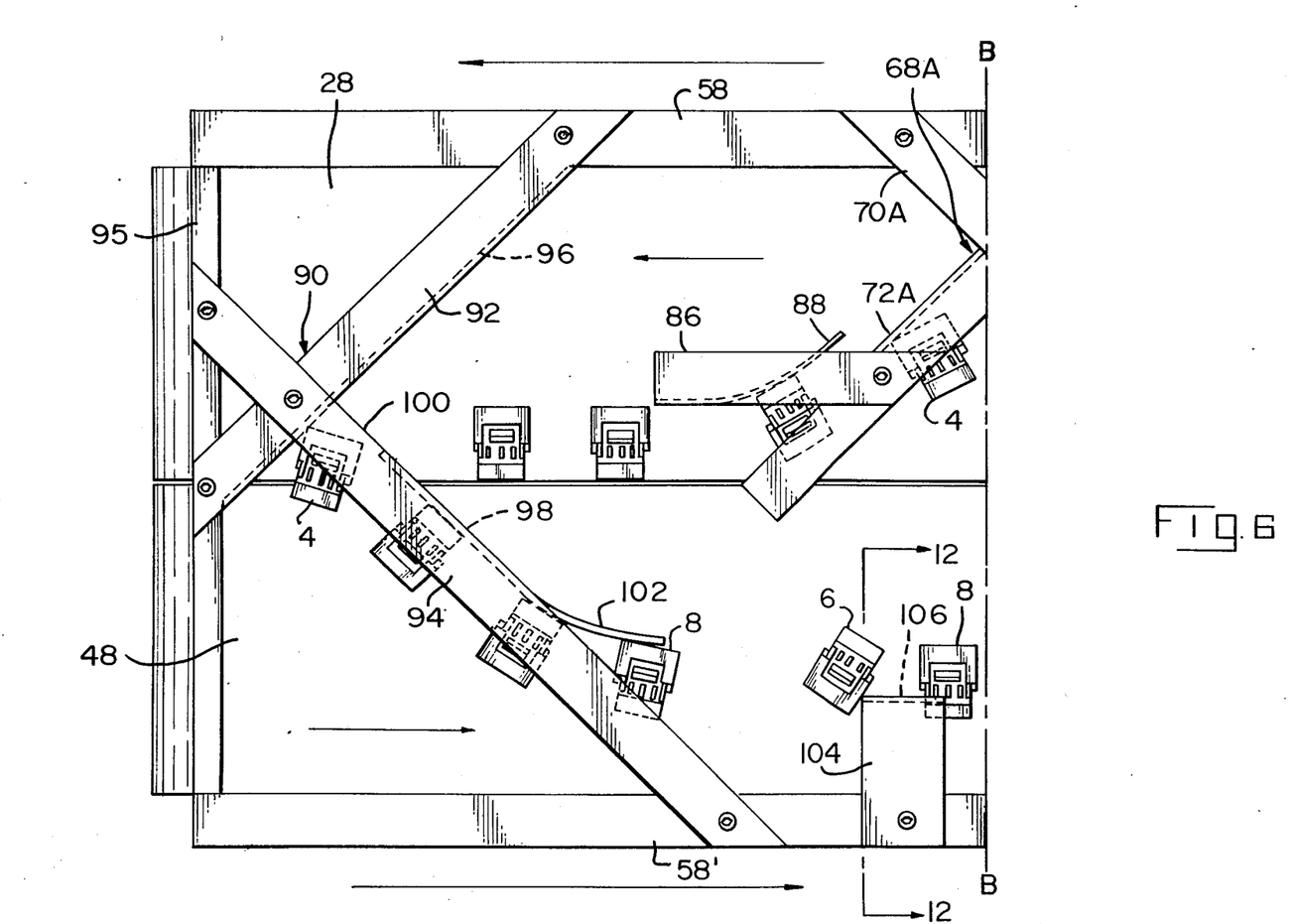
Figure 12:
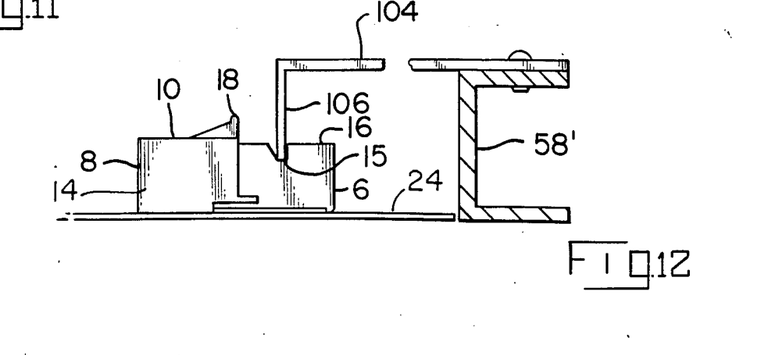
FIG. 12 is a view taken along the lines 12—12 of FIG. 6.

The orienting guide 104, FIGS. 6 and 12, comprises an L-shaped member having a depending flange 106 which is located such that its side edge will lie in the path of housings travelling from the flange 102 guide bar 94. The thickness of this flange is such that it can be received in a slot 15 in each housing adjacent to the surface 16 of the sidewall 10. If a housing is in the first stable attitude with its mating end 8 directed towards the first belt, the housing will pass under the orienting guide 104 with the depending flange of this guide 106 being received in the slot 15. If, however, the housing is oriented differently, the endwall 14 of the housing will be carried against the upstream edge of the flange 106 and the housing will be caused to turn or rotate through an angle of 90° so that its axis will extend parallel to the direction of movement of the second belt. When the housing moves past the downstream edge of flange 106, it will rotate an additional 90°. In FIG. 6, one housing is shown at the instant of engagement of its endwall with the upstream flange and it can be seen that movement of the belt will cause rotation of this housing with respect to a vertical axis extending through the housing and normally of the plane of the housing.

Figure 5:
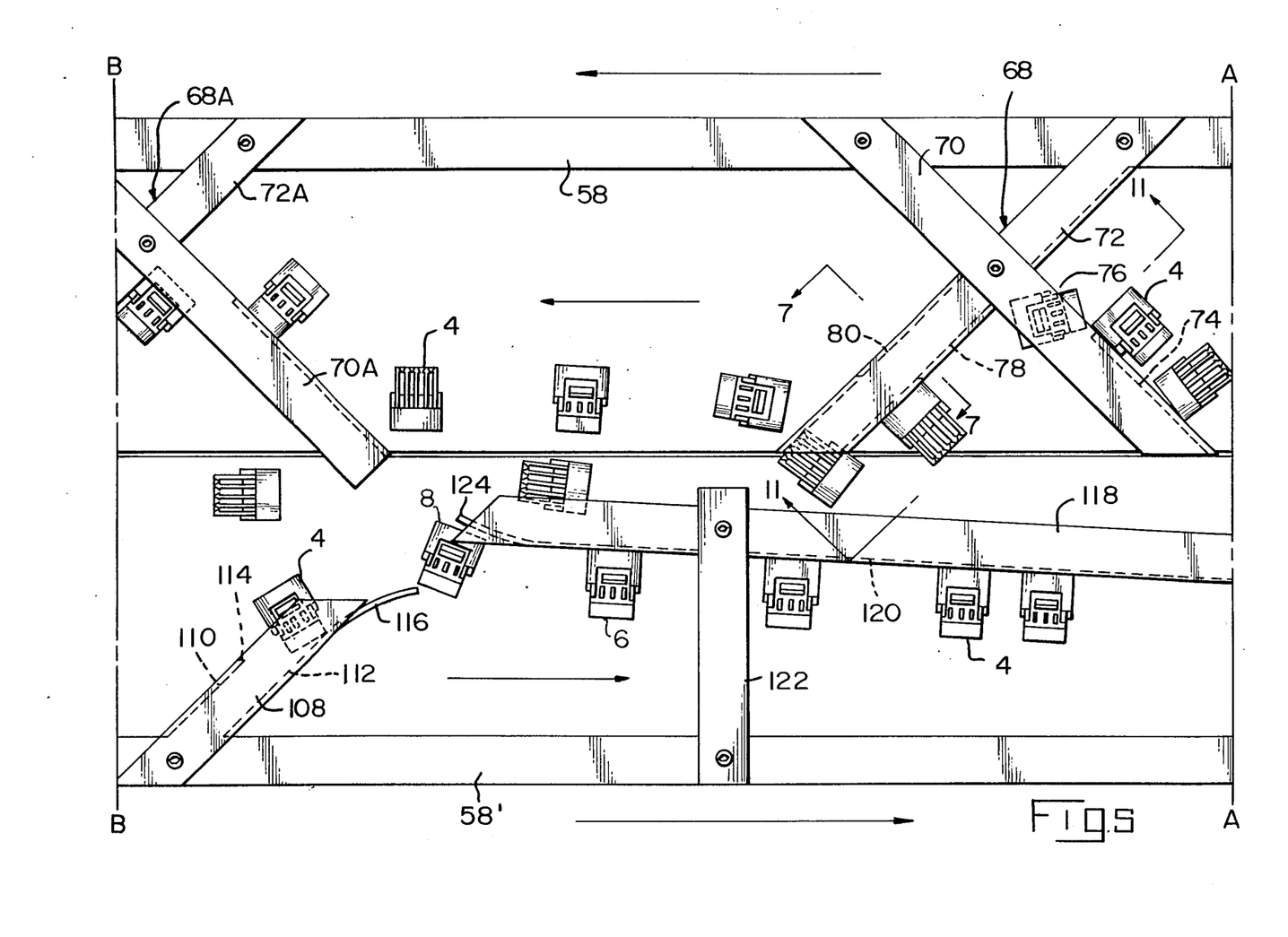

The housings are carried from the orienting guide 104 to an aligning guide 108 which comprises a channel-shaped member having depending flanges 110, 112. The upstream flange 110, as viewed in FIG. 5, is cut away as shown at 114 at a location spaced from the end of this guide to provide a gate that permits the housings to be carried against the internal surface of the downstream flange 112. This flange 112 extends beyond the end of the web portion of the channel and is arcuately formed as shown at 116, thereby to guide the housings towards first positioning guide 118. This positioning guide is again an L-shaped member having a depending flange 120 and is supported by means of a support bracket 122 extending from the channel member 58'.

As an alternative to the interfitting slot 15 and the guide 106 shown, the article can be provided with an upstanding rib and the guide made in the form of a channel to received the rib.

Figure 4:
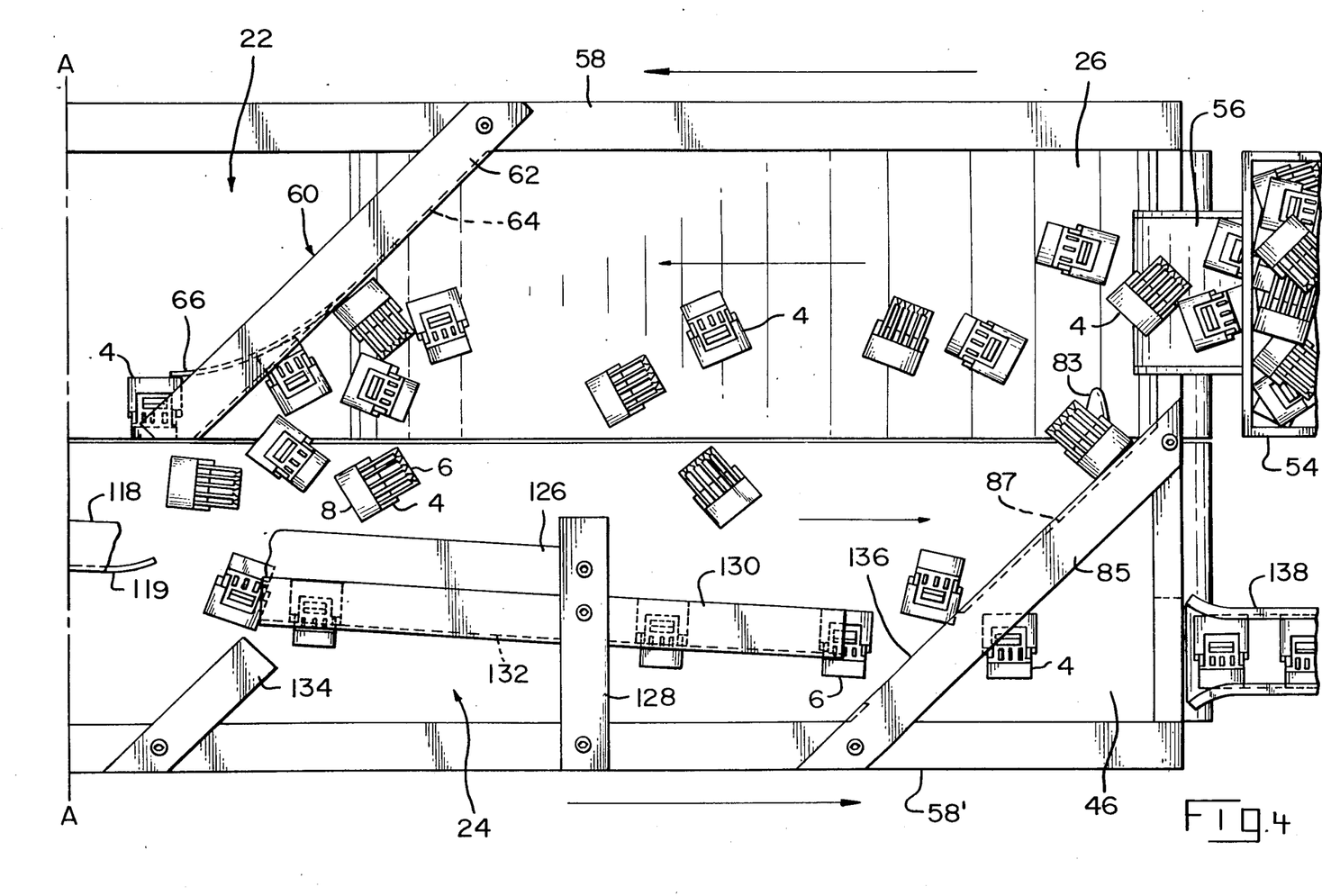
FIGS. 4, 5, and 6 are plan views on an enlarged scale of sections of the belt conveyor, FIG. 4 showing the right hand portion as viewed in FIG. 1, FIG. 5 showing an intermediate portion, and FIG. 6 showing the left-hand portion. These views can be placed against each other along the lines indicated to provide an overall enlarged view of the conveyor.

The depending flange 120 of the positioning guide 118 is broken away from the horizontal section of the guide adjacent to the lefthand end thereof as shown at 124 and is curved towards the first belt. The end portion 124 of the flange cooperates with the arcuate portion 116 of the flange 112 to guide the housings against the subsequent section of the flange 120. The housings are thus carried by the belt along the feed path with their mating ends 8 disposed against the surface of the flange 120. The guide 118 slopes as shown in FIGS. 5 and 4, towards the channel section 58' and the end 126 of the guide 118 overlaps a final positioning guide 130. The end 126 and the final positioning guide are both supported by a suitable bracket 128. The flange 120 ends, as shown at 119, at a location spaced from the upstream end of the final positioning guide 130 and the housings are carried from the end 119 of the flange 120 to the final positioning guide. Those housings which remain properly oriented move along a path such that they receive the lower free edge of the flange 132 of guide 130 in the slots 15. In this final stage then, the housings are guided very precisely, since they cannot move laterally, to a gate 136 in the previously identified return guide 85. The housings pass through this gate and are delivered to the discharge station 138 which may be in the form of a chute or a further conveyor which has sidewalls that confine the housings during further transport.

It is desirable to provide a barrier or guide, as shown at 134, in the form of an L-shaped member extending from the channel 58' to a location adjacent to the lefthand end of the final positioning guide 130. This barrier prevents any housings from passing between the flange 132 of guide 130 and the side edge of the belt.

Most of the housings which pass the second sorting guide 68a will finally arrive at the discharge station 138 in the preferred first stable attitude of FIG. 14 and in the preferred orientation. However, during subsequent movement, some of the housings will fail to be engaged by the series of guides and carried in the manner described above, for example, along the flange 120 of the guide 118. Any housings which are not oriented properly on the second belt in FIG. 5 will be rejected and carried to the return guide 87. Housings may be rejected by the end 124 of the flange 118 so that they are between the flange 118 and the inner edge of the second belt. Rejection of improperly oriented housings can also take place by the final positioning guide 130. If the housing does not receive the depending flange 132 of this final positioning guide in its slot 15, it will be moved laterally toward the inner edge of the second belt and carried against flange 87 of the return guide. Only those housings which emerge from the righthand end of the final positioning guide 130 will pass through the final gate 136.

Figure 13:
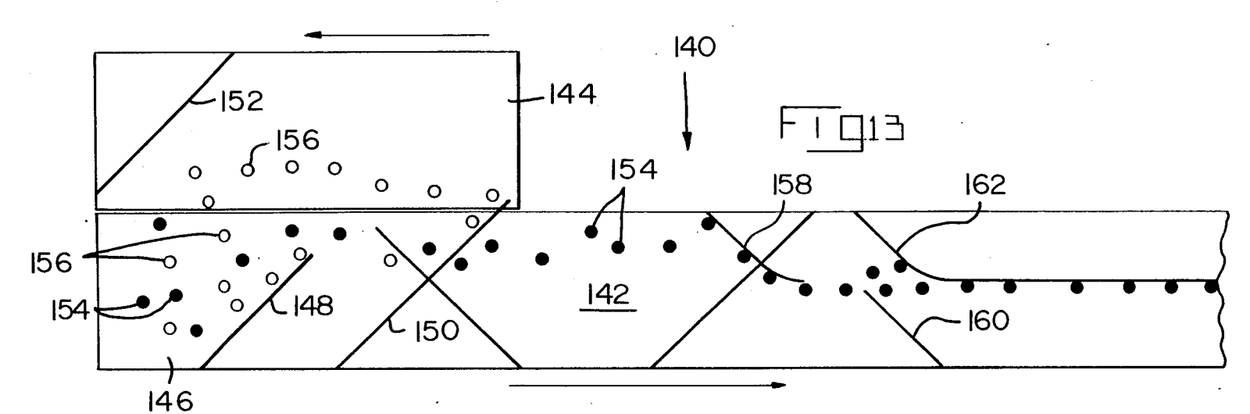
FIG. 13 is a diagrammatic plan view of an alternative embodiment.

FIG. 13 shows an alternative embodiment of the invention 140 having first and second belts 142, 144. The first belt extends an indeterminate length beyond the end of the second belt and the second belt 144 functions merely as a return belt having a return guide 152. The articles 154, 156 have a preferred attitude, as shown at 154, and the articles after passing a constricting guide 148 encounter a sorting guide 150. The articles 156 are rejected onto the second belt 144 while the articles 154 are carried on the first belt 142 past a series of aligning guides, as shown at 158, 160, and 162.

An advantageous feature of the invention is the provision of the separate belt drives 42, 42' for the first and second belts with each belt drive permitting variation in the belt speed. By virtue of this feature, the first belt can be driven at a higher speed than the second belt 24 in order to ensure an adequate supply of articles to the second belt and achieve maximum feeding efficiency. Furthermore, there may be an optimum belt speed for a particular article which will achieve a higher efficiency than the speed higher or lower than the optimum. This optimum speed may vary with the nature of the article and the manner in which it behaves on the conveyor. The provision of the separate belt drives and variable speed belt drives permits fine tuning of the conveyor for any article being conveyed.

We claim:

1. A belt conveyor for conveying articles from a loading zone along a conveyor path, the conveyor being of the type having first and second conveyor belts in side-by-side adjacent relationship, the belts each having a first end and a second end, the first ends being adjacent to each other and the second ends being adjacent to each other, the first belt being movable in a direction extending away from its first end, the second belt being movable in a direction extending towards its first end, the loading zone being at the first end of the first belt, the loading zone being at a level below the level of the first end of the second belt, the articles having first and second stable attitudes on the first belt when delivered to the loading zone, the conveyor being characterized in that:

a sorting guide extends transversely across the first belt towards the second belt at a location spaced from the loading zone, the sorting guide having a gate therein which permits articles in the first stable attitude to pass the sorting guide and which prevents articles in the second stable attitude from passing the sorting guide, the sorting guide having guiding surfaces which guide articles in the second stable attitude laterally on the first belt towards and onto, the second belt, a transfer guide is provided at the second end of the first belt having transfer guide surfaces which guide articles laterally of the first belt and onto the second belt whereby transferred articles in the first stable attitude are carried from the second end of the second belt to the first end of the second belt, a discharge station is provided at the first end of the second belt for discharging articles in the first stable attitude, the second belt having a series of article guides in spaced relationship to the surface thereof for guiding the articles to the discharge station, and a return guide is provided on the second belt at the first end thereof having guiding surfaces which guide any articles in the second stable attitude, which passed the sorting guide, laterally of the second belt and towards the loading zone whereby the articles fall onto the loading zone on the first belt and at least some of the articles will have the first stable attitude when they arrive in the loading zone.

2. A belt conveyor as set forth in claim 1 having an attitude changing guide which causes articles to tumble as they are guided from the second belt to the loading zone whereby the articles assume the first stable attitude when they arrive in the loading zone.

3. A belt conveyor as set forth in claim 2, the attitude changing guide extending laterally from the second belt and over the loading zone of the first belt, the attitude changing guide having a sloping surface which encourages tumbling of articles moved thereover as the articles fall towards the loading zone.

4. A belt conveyor as set forth in either claims 1 or 3 having a flow constricting gate on the first belt between the loading zone and the sorting guide, the constricting gate constricting the movement of articles from the loading zone so that the articles are carried single file on the first belt.

5. A belt conveyor as set forth in claim 1, at least one of the article guides being a guide bar extending in the general direction of movement of the second belt, the guide bar having a lower free edge portion which is proximate to, and spaced from, the surface of the second belt, the free edge portion being dimensioned to enter a transverse slot in the articles being fed on the belt conveyor whereby articles being carried by the second belt are precisely positioned between the side edges of the second belt as the articles are moved past the guide bar with the free edge portion of the guide bar received in the slots in the articles.

6. A belt conveyor as set forth in claim 5, the guide bar extending diagonally with respect to the second belt whereby the articles are moved laterally on the surface of the second belt while they are being carried to the discharge station.

7. A belt conveyor as set forth in claim 5, the free edge of the guide bar extending parallel to the direction of movement of the second belt.

8. A belt conveyor for conveying articles along a conveyor path to a discharge station, the conveyor having static guides associated with the conveyor belt for changing the positions of the articles on the conveyor belt, the belt conveyor and static guides being characterized in that:

at least one of the guides comprises a guide bar extending in the general direction of movement of the conveyor belt, the guide bar having lower free edge portions which are proximate to, and spaced from, the surface of the conveyor belt, the free edge portions and the articles having interfitting guiding portions, the interfitting guiding portions comprising a slot in each of the articles, the slot being dimensioned to receive the free edge portions of the guide bar, whereby articles being carried by the belt are precisely positioned between the side edges of the belt as the articles are moved past the guide bar with the interfitting guiding portions interfitted with each other, the articles having first and second ends, the guiding portions of the articles extending substantially parallel to, and being between, the ends and being relatively closer to the first end than the second end, the articles being required to be in a preferred orientation at the discharge station with the guiding portions extending parallel to the direction of movement of the belt, the belt conveyor having one positioning guide which is upstream from, and adjacent to, the guide bar, the positioning guide having guide surfaces which guide the articles towards the guide bar with the guiding portions in the articles extending parallel to the direction of belt movement whereby those articles which are in the preferred orientation will pass the guide bar with the bar being received in the guiding portions, and those articles which are received from the preferred orientation will strike the guide bar and be rotated under the influence of the moving belt and the edge of the guide bar.

9. A belt conveyor belt as set forth in claim 8, the guide bar extending diagonally with respect to the belt whereby the articles are moved laterially on the surface of the belt while they are being carried by the belt.

10. A belt conveyor as set forth in claim 8, the free edge of the guide bar extending parallel to the direction of movement of the belt.

* * * * *

UNITED STATES PATENT OFFICE
CERTIFICATE OF CORRECTION

Patent No. 4,690,266          Dated 9/1/87

Inventor(s) Stanley W. T. Croman et al.

It is certified that error appears in the above-identified patent and that said Letters Patent are hereby corrected as shown below:

In the claims:

Column 9, line 3, claim 8, delete "received" and insert --- reversed ---.

Signed and Sealed this

Ninth Day of February, 1988

Attest:

DONALD J. QUIGG

*Attesting Officer*          *Commissioner of Patents and Trademarks*